Dec. 6, 1966 S. V. CRAVENS 3,289,951

COUNTERROTATING DISK COHESIVE MATERIAL DISINTEGRATOR

Filed July 26, 1963 6 Sheets-Sheet 1

INVENTOR.
SAMUEL V. CRAVENS

BY Robert W. Beach

ATTORNEY

INVENTOR.
SAMUEL V. CRAVENS
BY Robert W. Beach
ATTORNEY

Dec. 6, 1966

S. V. CRAVENS

COUNTERROTATING DISK COHESIVE MATERIAL DISINTEGRATOR 3,289,951

Filed July 26, 1963

6 Sheets-Sheet 3

INVENTOR
SAMUEL V. CRAVENS

BY Robert W. Beach

ATTORNEY

Dec. 6, 1966 S. V. CRAVENS 3,289,951
COUNTERROTATING DISK COHESIVE
MATERIAL DISINTEGRATOR
Filed July 26, 1963 6 Sheets-Sheet 4

INVENTOR.
SAMUEL V. CRAVENS

BY Robert W. Beach

ATTORNEY

INVENTOR.
SAMUEL V. CRAVENS
BY Robert W. Beach
ATTORNEY

INVENTOR.
SAMUEL V. CRAVENS
BY Robert W. Beach
ATTORNEY

United States Patent Office 3,289,951

Patented Dec. 6, 1966

3,289,951

COUNTERROTATING DISK COHESIVE MATERIAL DISINTEGRATOR

Samuel V. Cravens, West Vancouver, British Columbia, Canada, assignor to Maruma Enterprises Ltd., Vancouver, British Columbia, Canada, a corporation of Canada Filed July 26, 1963, Ser. No. 297,753
10 Claims. (Cl. 241—39)

This invention relates to the method of subdividing or disintegrating cohesive material into minute components, apparatus for performing such method and the fine particle material resulting from the performance of such method.

Apparatus used heretofore for reducing coarse material of hard cohesive character to fine material has usually been one of four types, namely, material crushing devices, ball mills, hammer mills or abrading disk grinders. These devices have the common characteristic of disrupting the interface bond between particles of the cohesive material by compression or shearing, or a combination of such forces. Crushing of material produces primarily compression forces, hammer mills effect primarily abrupt compression forces in the form of successive impacts, disk grinders probably exert greater shearing forces than compression forces and ball mills produce a combination of shearing and compression forces on the cohesive material. The process and apparatus of the present invention, on the contrary, effects disruption of the interfacial bond between components of cohesive material by rapid motion, which probably utilizes principally the disruptive effect of centrifugal force resulting from rapid whirling of the cohesive material.

It is a principal object of the present invention to effect subdivision or disintegration of cohesive material and particularly such material of hard character, such as rock or stone, by disrupting the interfacial bond between unlike component particles of the material by the application principally of tension forces as distinguished from shearing and compression forces. Utilization of tension forces for this purpose tends to cause more complete separation of components of the cohesive material of different composition, such as mineral particles and gangue particles with minimum damage to the individual particles.

One very desirable application for the present invention is for comminuting pieces of rock and stone preparatory to separating minerals from gangue of the cohesive stone or rock material. While such material is hard it is composed of minute components of unlike material bonded together in the formation of the rock or stone from a molten form or by great pressure, or both. The mineral particles are distinguishable from other particles in rock or stone ore and the problem of recovering such mineral particles separate from the remainder of the ore or gangue first requires disruption of the bond between the mineral particles and the other particles. Such disruption of the bond is usually accomplished by a grinding or a hammering or crushing process, as mentioned above. Any such process tends to break up the mineral particles themselves and press them into adhering contact with nonmetallic material instead of effecting clean cleavage between the mineral particles and the other particles.

It is an additional object, therefore, to provide apparatus by the use of which pieces of cohesive material can be subjected to rapid motion of a type which will induce disruption of the interfacial bond between minute components of the cohesive material, as distinguished from comminuting the material by subjecting it to compression and/or shearing forces. More specifically it is an object to provide apparatus which will induce a rapid whirling motion of pieces of cohesive material at a speed sufficiently high that centrifugal force will cause failure of the interfacial bond between components of the cohesive material.

It is also an object to provide apparatus for subdividing cohesive material which will have a high capacity for its size and can be operated economically.

Another object is to provide apparatus for disintegrating cohesive material which is of simple and durable construction, and the parts of which will not be worn rapidly despite processing of hard material at high speed by the apparatus.

The foregoing objects can be accomplished by moving pieces of cohesive material into the hollow between two dished counterrotating disks disposed coaxially with their hollow sides disposed in close proximity and facing each other. Air supplied to the cavity between such disks will suspend the subdivided particles of the cohesive pieces and move them to the peripheries of the disks and between their rims, and carry the component particles from the disintegrating apparatus. The current of air through the apparatus can be produced by a suction exhaust blower and the quantity of air flowing through the apparatus can be regulated by inflow dampers. Feed mechanism supplies accurately measured amounts of cohesive material pieces to the cavity between the rotating disks and the disks are rotated at a speed sufficiently high to effect whirling of the pieces of material between them sufficiently rapidly to effect disruption of the interfacial bond between the components of the cohesive material.

Figure 1:
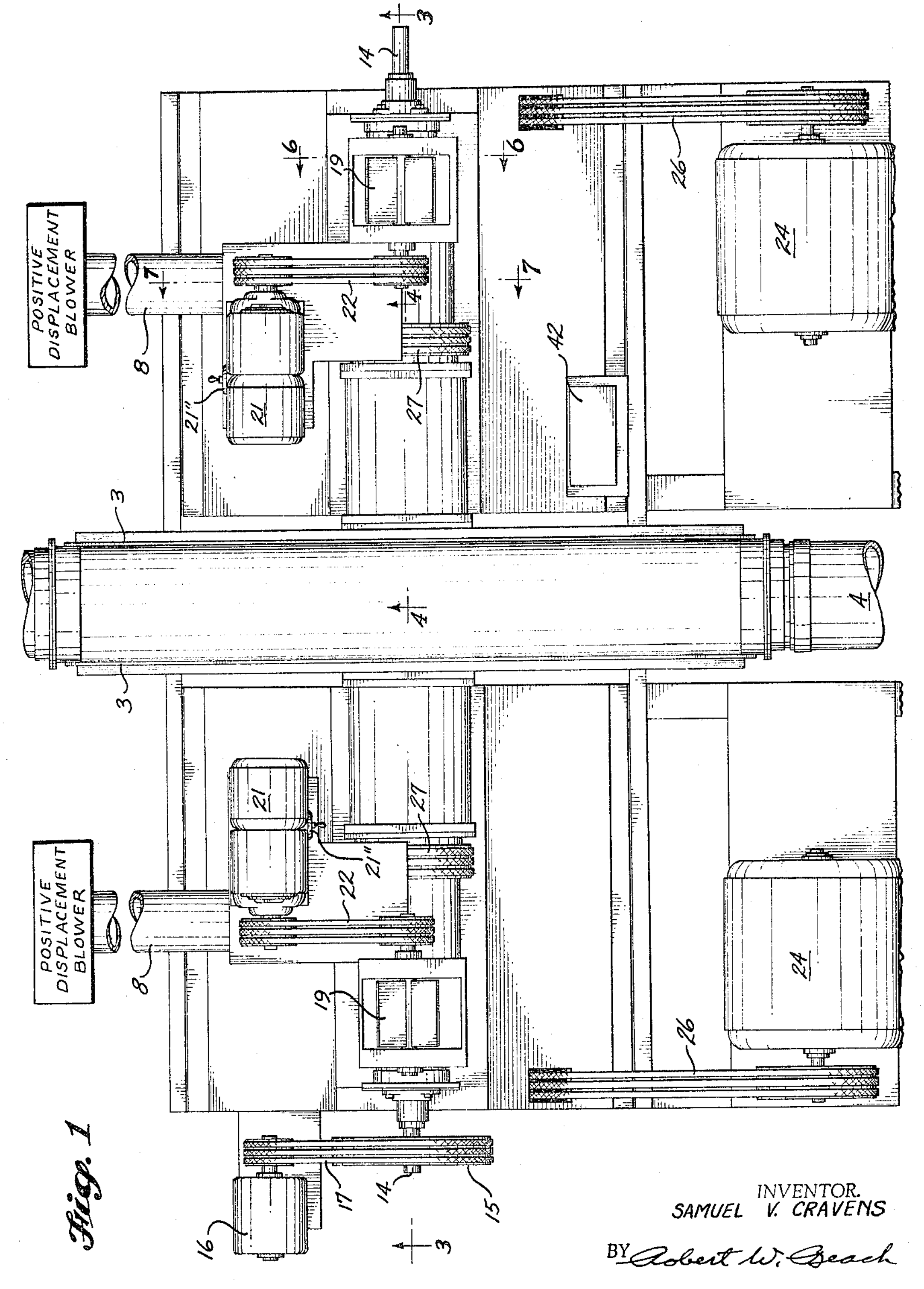
FIGURE 1 is a plan of the cohesive material disintegrator and FIGURE 2 is an end elevation of such disintegrator, with parts broken away.
Figure 3:
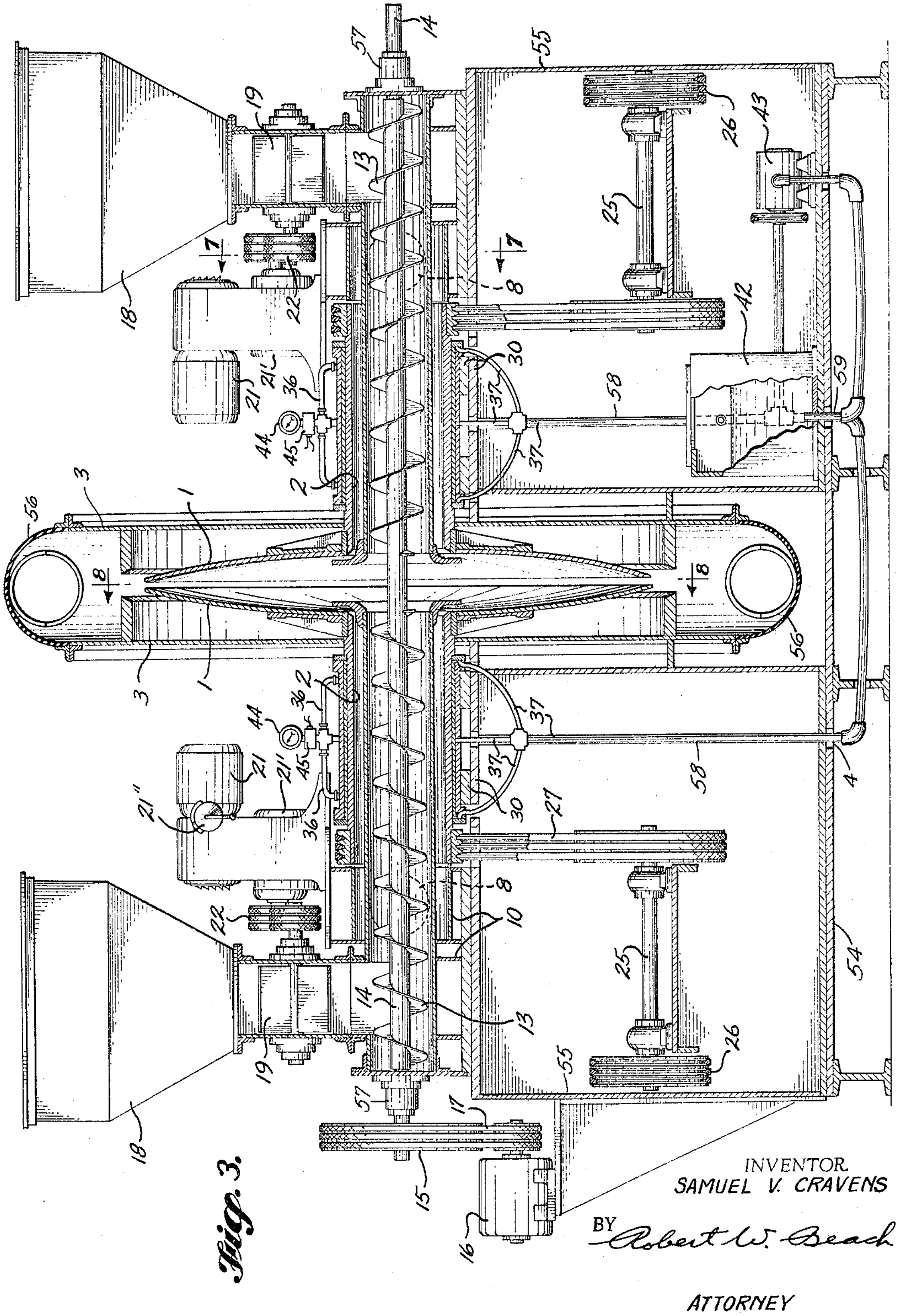
FIGURE 3 is a longitudinal vertical section through the disintegrator taken on line 3—3 of FIGURE 1.
Figure 6:
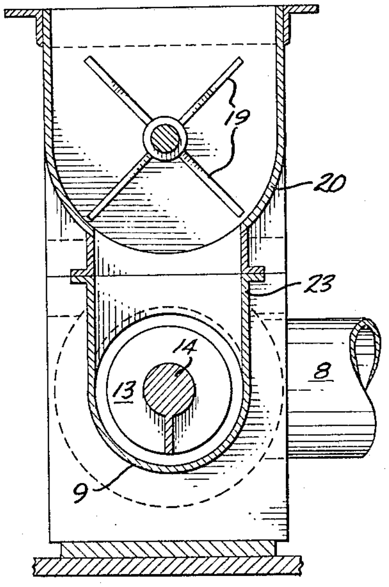
Figure 7:
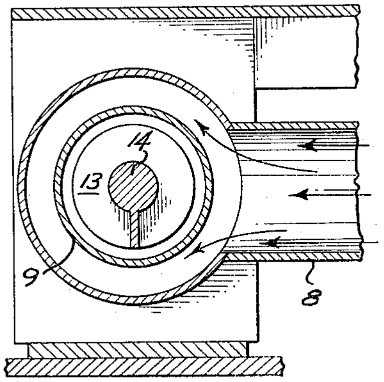

FIGURE 6 is a transverse vertical section of a portion of the disintegrator taken along line 6—6 of FIGURE 1 and FIGURE 7 is another transverse vertical section of a portion of the disintegrator taken along line 7—7 of FIGURES 1 and 3.

Figure 8:
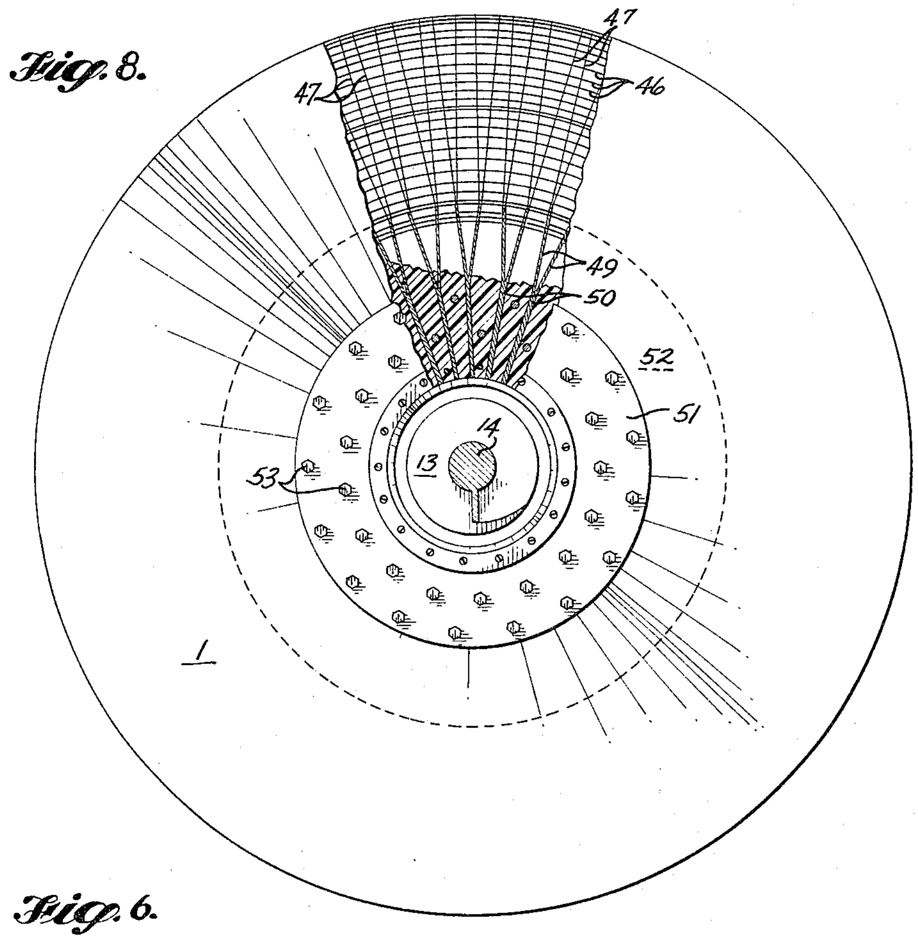
Figure 9:
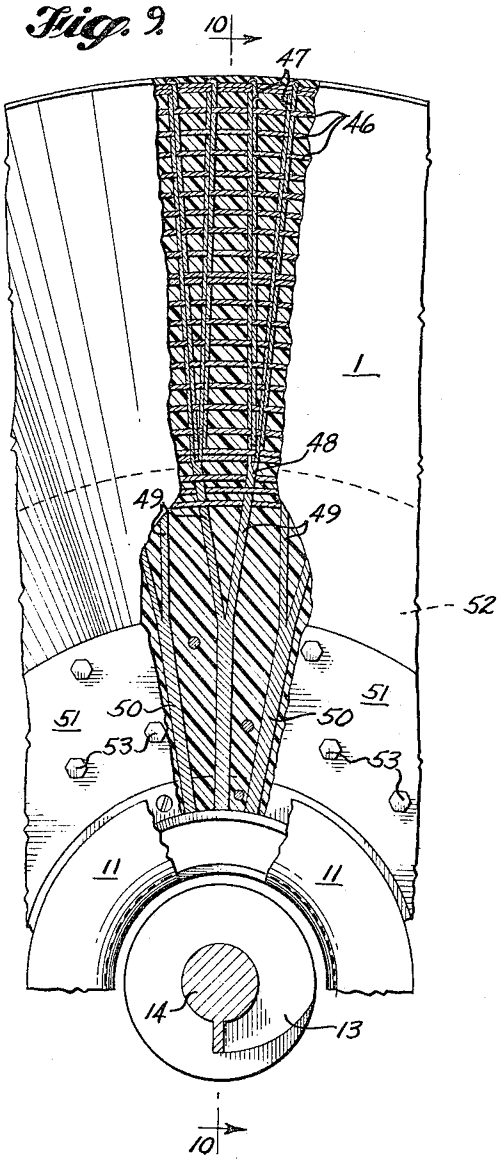
Figure 10:
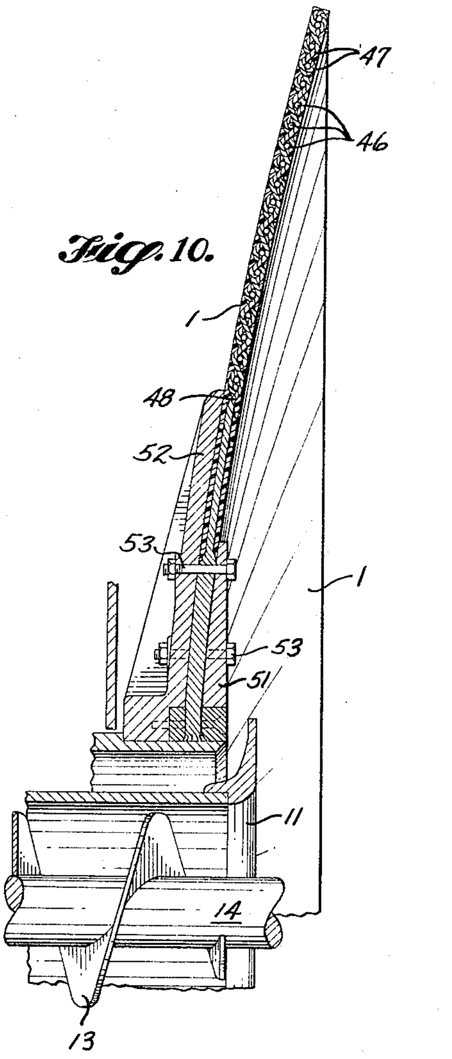

FIGURE 8 is an enlarged transverse vertical section through the central portion of the disintegrator on line 8—8 of FIGURE 3, parts being omitted and other parts being broken away, FIGURE 9 is an enlarged fragmentary view of a portion of FIGURE 8 and FIGURE 10 is a section taken on line 10—10 of FIGURE 9.

The key feature of the present invention is the provision of a chamber in which pieces of coherent material are whirled at high speed to produce forces which disrupt the bond between minute components of the pieces and effect their subdivision. In the apparatus of the present invention such chamber is formed in the hollow between two dished rotating disks 1, which are arranged in coaxial adjacent relationship with their dished sides facing each other, as shown in FIGURE 3. The capacity of the disintegrator will depend to a considerable extent on the size of this chamber. The size of the chamber is determined by the diameter of the disks, their axial spacing and the degree of hollow of each disk. Preferably the disks are formed as spherical segments with their rims disposed close together, but spaced apart sufficiently to provide an annular slot through which disintegrated material can be discharged from the disintegrating chamber.

The second most important feature of the invention is to process the pieces of cohesive material in the disintegrator chamber in a manner such that the interfacial bond between their components will be disrupted without the application of any appreciable shearing or compressive force to the pieces. This result is accomplished by supporting the disks 1 in cantilever fashion on the adjacent ends of hollow coaxial shafts 2 supported in long bearings for rotation at speeds sufficiently high so that the peripheral portions of the disks will move in opposite direction at velocities of 500 to 1100 feet per second. Thus, if the disks are 2 feet in diameter the disks should be capable of rotating at 5,000 to 11,000 revolutions per minute. In a larger disintegrator the disks 1 may be 5 feet in diameter, in which case the speed of disk rotation could be from 2,000 to 4,500 revolutions per minute.

The third important feature of the present invention is to provide a proper circulatory flow of air through the disintegration chamber to serve the dual purpose of suspending the pieces of cohesive material and the particles into which such pieces are disintegrated in air, so that they can be whirled at high speed with minimum resistance and which, in addition, will carry the pieces and partices of the cohesive material through the disintegration chamber for discharge through the slot between the rims of the disks. The disintegrator chamber is supplied with the proper amount of air by a positive displacement type of blower. The quantity of air supplied should be correlated with the amount of material being processed to obtain the most effective disintegrating operation, and can be regulated by varying the speed of the blower motor. Air flow is also provided to convey the disintegrated particles away from the disks 1 by enclosing them in a housing 3 and producing suction in outlet pipes 4 which are connected to opposite sides of such housing and joined by a T 5 connected to a suitable blower. Air flow through the housing can be regulated by varying the speed of the suction blower or by suitably adjusting dampers 6 in air inlets 7. Such dampers can be of the slide, butterfly, iris or pivoted type for adjustability.

Air is supplied to the central portion of the disintegrator chamber between the disks 1 through pipes 8 at opposite sides of the disintegrator, as shown in FIGURE 1, which are connected to the annular passages, respectively, formed between the outer hollow shafts 2 and concentric inner stationary cantilever tubes 9. The end of each tube adjacent to a disk 1 has on it a bell-shaped flange, preferably in the form of a collar 11, spaced from the central aperture 12 of each disk and flaring into the disintegrator chamber between the disks. Such flanges deflect air from the annular passage into the disintegrator chamber.

The other principal feature of the distintegrator apparatus is the provision of an arrangement to supply to the disintegrator chamber between the disks 1 pieces of cohesive material to be subdivided. The size of such pieces which can be fed to the disintegrator chamber for effective disintegration will depend to a considerable extent on the size of the disintegrator chamber. Thus, if the disks 1 are approximately 2 feet in diameter the pieces should be not greater than approximately one-quarter of an inch in maximum dimension, whereas if the diameter of such disks is approximately 5 feet pieces having a maximum dimension not greater than about three-quarters of an inch can be disintegrated reasonably successfully. The velocity of disintegrator disk rotation will also have a bearing on the size of pieces which can be disintegrated effectively. The greater the circumferential velocity of the disks the larger will be the pieces which can be suspended in the airflow between them.

It is important that the amount of material supplied to the distintegrator chamber be metered accurately so that the disintegrator can be operated close to its maximum capacity without loading the disintegrator chamber to such an extent that the pieces of cohesive material cannot be whirled in suspension at a speed sufficiently great to disrupt the interface bond between components of the pieces effectively. The pieces of cohesive material are fed positively to the disintegrator chamber between the counterrotating disks 1 by screw conveyors 13 extending through the stationary tubes 9. Such screw conveyors can be formed as helices convoluted in opposite senses on a single shaft 14 extending completely through the disintegrator and the central portion of the disintegrator chamber between the disks 1. Such shaft is turned by the pulley 15 to which the drive motor 16 is connected by V-belts 17.

The screw conveyors 13 will move cohesive material pieces progressively through the tubes 9 to the disintegrating chamber, but in order to maintain a constant feed of material it is necessary that such material be supplied to the screw conveyors at a measured rate. For this purpose material is supplied to the two screw conveyors from hoppers 18 at opposite ends of the apparatus by metering rotary feeders, each including a vaned rotor 19, a cooperating casing 20 and a motor 21 connected by a V-belt drive 22 to turn the rotor in each instance. The lower portion of the rotor casing 20 is of semicylindrical curvature, as shown in FIGURE 6, having a radius corresponding to the radial lengths of the rotor vanes 19. In FIGURE 6 each rotor of a rotary feeder is illustrated as having four vanes angularly spaced apart 90 degrees forming quadrant-shaped recesses between adjacent blades. These recesses or pockets segregate a measured amount of material from the discharge throat of the hopper 18 and move it into registry with the chute 23 to drop into the open side of the tube 9. The measured amount of material thus fed by each rotary feeder to its screw conveyor will therefore be governed by the speed at which the respective feeder rotors are turned. Consequently, the motor 21 should be of the variable speed type, having a variable speed drive 21' adjustable by control 21''.

Figure 2:
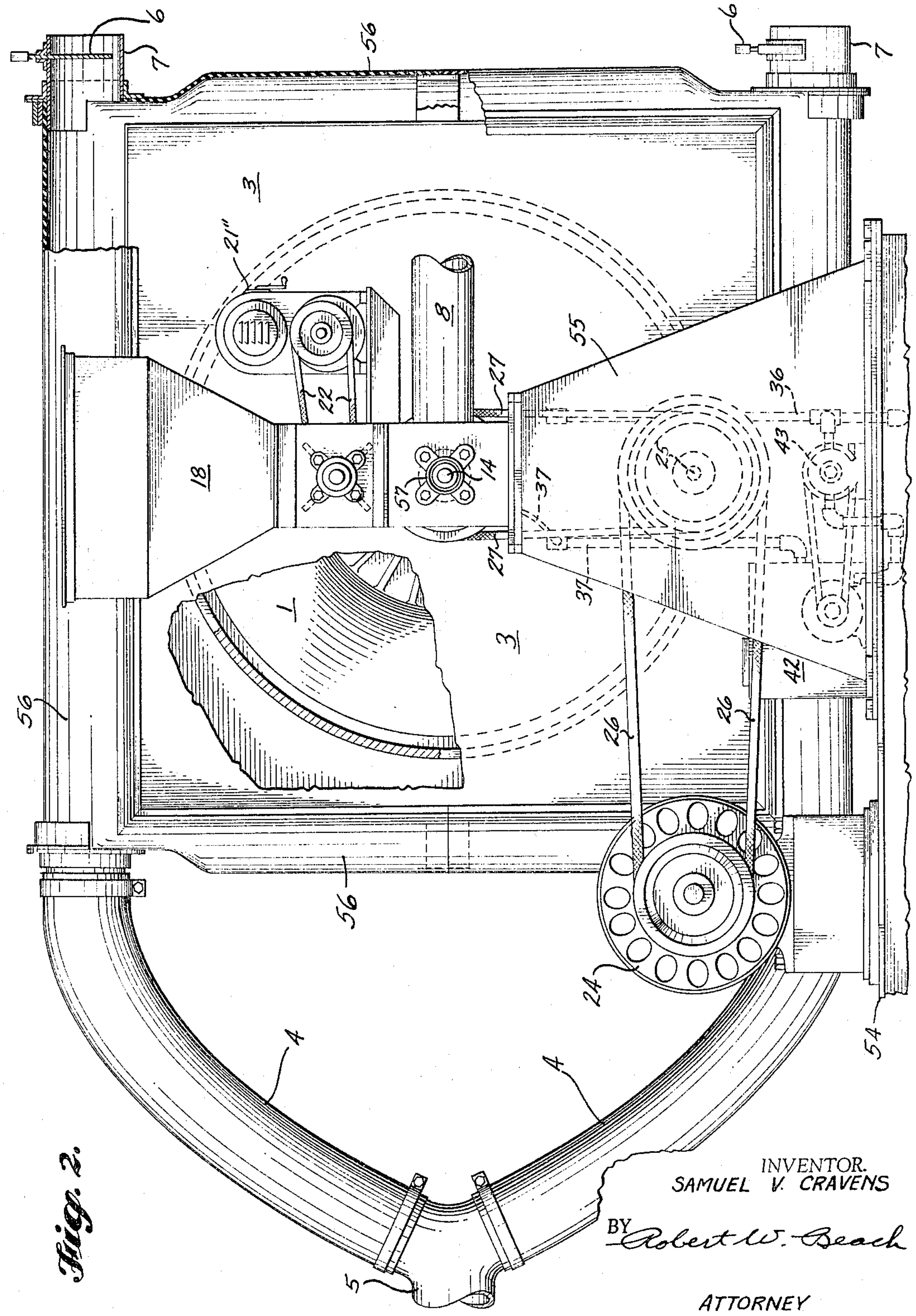

It is believed that the disintegration of the pieces of cohesive material is effected by whirling of such pieces at high speed in the disintegrating chamber between the counterrotating disks 1. It is necessary therefore that these disks be rotated rapidly in order to produce such high speed whirling of the pieces to be disintegrated, and in order to effect whirling of such pieces without appreciable movement circumferentially of the disintegrating chamber it is essential that the disks 1 be rotated at approximately equal speeds in opposite directions. Such disk rotation speeds can be controlled sufficiently closely by driving them with motors 24, shown in FIGURES 1 and 2, which are of the same size and have similar characteristics so that they will rotate at virtually equal speeds. It is then only necessary to connect such motors to the shafts 2 carrying the respective disks 1 by some type of driving mechanism. Conveniently the motors 24 can drive jack shafts 25 by a V-belt drive 26 and the opposite end of each jack shaft is connected by a V-belt drive 27 to the end of its shaft 2 remote from its disk 1.

Because of the high speed rotation of the disks 1 it is important that the shafts 2 carrying such disks be supported steadily and precisely by a bearing construction providing minimum friction. Bearings suitable for this purpose are shown generally in FIGURE 3 and in detail in FIGURE 4 and FIGURE 5. To each shaft 2 is secured an axial thrust collar 28 by screws 29. The bearing is supported by the stationary bearing mounting structure 30 and two spaced bearing ring assemblies are installed between the stationary structure 30 and bearing end caps 31 secured by bolts to the stationary structure 30.

Each of the bearing ring assemblies includes two opposite flange rings 32, which are bolted to a backing ring 33 of steel, so as to form an internal annular channel-shaped cavity. In this cavity are received two concentric floating bearing sleeves including an inner bronze sleeve 34 and an outer cast iron sleeve 35. Preferably these sleeves are of equal axial width which is slightly less than the spacing between the adjacent faces of the flange rings 32, so as to provide adequate axial clearance between the floating bearing sleeves and the channel-shaped annular housing. The inner bronze sleeve will have bearing engagement with the exterior of the disk supporting shaft 2, and the outer bearing sleeve will have bearing engagement with the inner side of the bearing housing ring 33.

Figure 4:
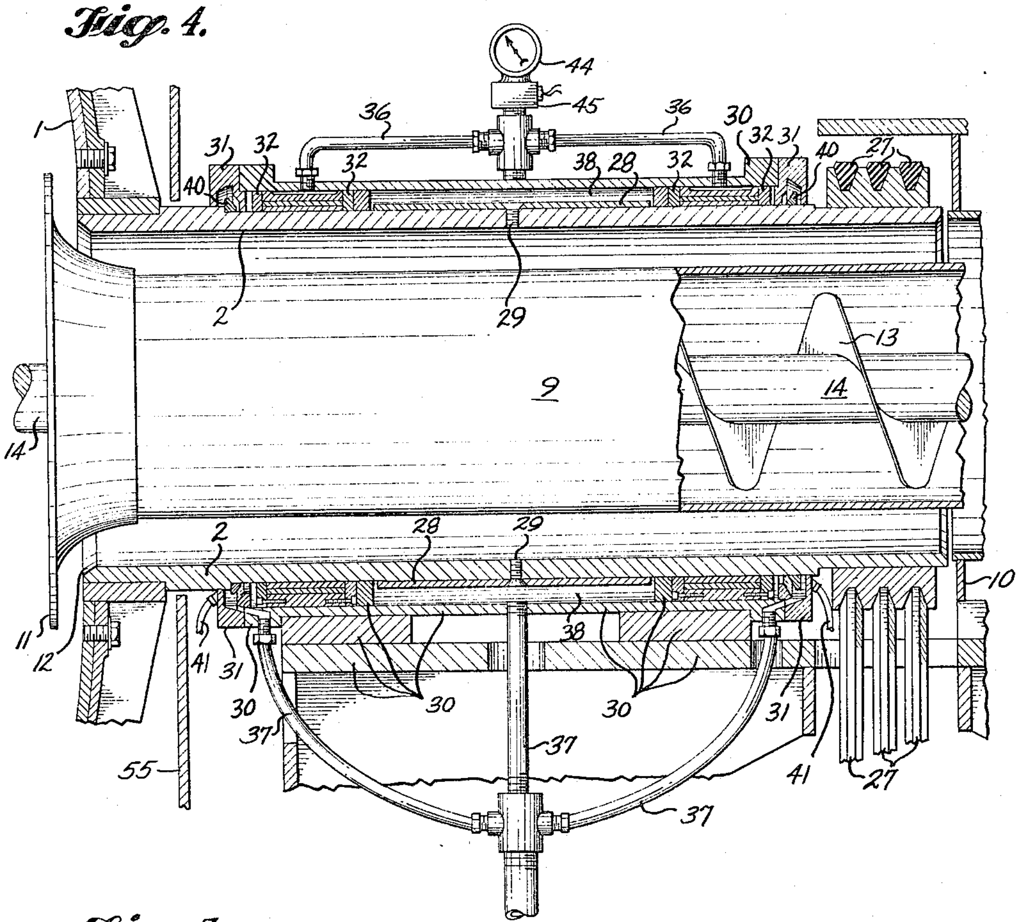
FIGURE 4 is an enlarged longitudinal vertical section through a portion of the disintegrator on line 4—4 of FIGURE 1, parts being broken away.
Figure 5:
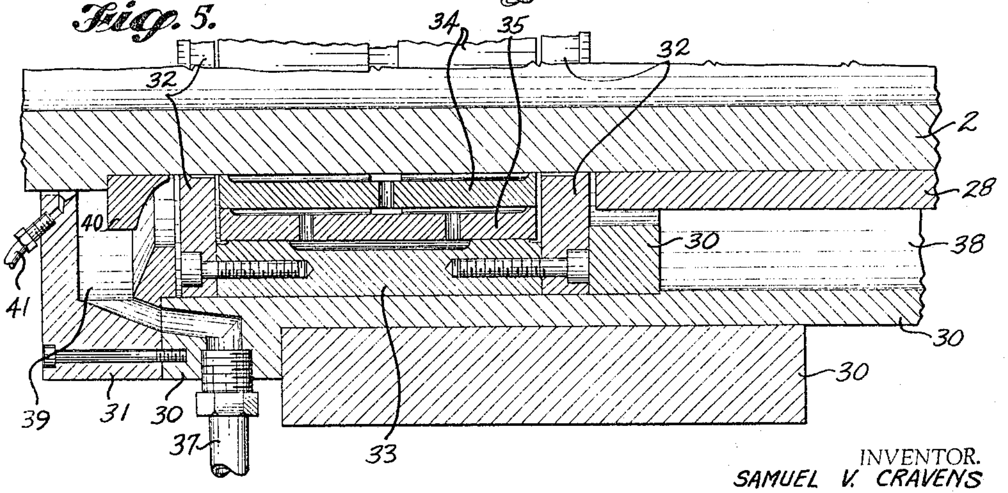
FIGURE 5 is a further enlarged section showing a portion of the construction illustrated in FIGURE 4.

Since the sleeves 34 and 35 are floating, relative rotation can occur between the hollow shaft 2 and the inner sleeve 34 or between the inner sleeve 34 and the outer sleeve 35, or between the outer sleeve 35 and the ring 33. To insure free running of the bearings ample lubrication is provided; thus the inner side of the inner bearing sleeve 34 has an annular lubricant-receiving groove on its inner side with lubricant supply ports extending through such sleeve. Lubricant is supplied to such ports from a groove in the inner surface of the outer bearing sleeve 35 and ports through this sleeve receive lubricant from an annular groove in the inner side of the bearing backing ring 33. This backing ring groove receives lubricant from passages in the bearing supporting structure, as shown in FIGURE 4, to which the lubricant is supplied through pipes 36.

Lubricant works its way along the shaft from the bearing sleeves to opposite sides of each bearing, and such lubricant is returned to the lubricant supply system through return pipes 37. Such pipes communicate with the space 38 between the annular bearings and with the spaces 39 at the ends of the bearing assemblies within the caps 31. Lubricant is flung into such spaces 39 by the rings 40 at opposite ends of the bearing construction, which are secured on shaft 2. Lubricant is prevented from leaking past the bearing cap 31 by slightly pressurizing the spaces 39 with air through a compressed air supply connection 41 feeding into a groove in the flange of the bearing cap 31 adjacent to the shaft 2. From the pipes 37 oil drains back to the reservoir 42 shown in FIGURE 3, from which it is recirculated by an oil pump 43 to the oil supply pipes 36. Between the branches of oil supply pipe 36, shown in the upper portion of FIGURE 4, a pressure gauge 44 may be provided to indicate the pressure of the oil in the lubricant supply system. Also in the pressure gauge line a pressure controlled safety switch 45 may be provided which is connected in series with the control circuits of the disk driving motors 24 so that rotation of the disks cannot be initiated until the pressure of the oil in the bearing oil supply lines 36 has increased to a selected safe value.

The bearing construction described will support the disks 1 for the high speed rotation necessary for best operation of the disintegrator. The smaller the disks the higher must be their rotative speed, and because of the high speed they must be supported accurately in perfect balance. Such disks can, for example, be made of saw steel hammered into dished shape. Disks of such material having a diameter of approximately two feet cannot be rotated safely at speeds appreciably exceeding 6400 revolutions per minute, but a more effective operation can be accomplished by higher speed rotation such as, as much as 10,000 to 12,000 revolutions per minute. Larger disks are effective at slower speeds provided that the peripheral speed is maintained at a high value. It is desirable for the peripheral speed of each disk to approach the speed of sound.

The disks 1 themselves can be of different shapes and made of different materials. The central portion of each disk is dished and such dish can be either conically concave or concave in the shape of a spherical segment. Such hollow portion of the disk can extend completely to the periphery of the disk or the outer portion, such as approximately the outer one-quarter of the radius, can be planar. The high speed rotation of the disk may cause deflection of the peripheral portion of the disk if it is cupped to approach more nearly planar condition. Also, the inner surface of each disk can be smooth or it can be provided with shallow grooves extending generally radially to catch the air between the disks and increase its vortical rotation generally about radial lines, because of the opposite rotation of the disks. If such grooves are provided they are preferably inclined relative to radii of the disk, being disposed with their outer ends in advance of their inner ends in the direction of rotation of the disk. The angle between each groove and a radius of the disk passing through its inner end may be approximately 20 degrees.

As mentioned above, the disks can be made of saw steel but it is preferred that they be made of stronger and lighter weight construction. Such a construction is shown in FIGURES 8, 9 and 10 as including a reinforcement web of stainless steel strands, such as cable, embedded in plastic, such as polyester resin, epoxy resin or some other suitable high strength light weight resin.

The stranded skeleton of the preferred type is shown best in FIGURES 9 and 10. Such skeleton includes endless circumferential rings 46 of stainless steel cable which are of different circumferential extent so that they can be spaced apart radially, as shown in FIGURE 9, at approximately equal intervals. Such circumferential cables may be arranged in approximately the outer half of the total radial width of the disk and may be spaced apart radially approximately one inch, or possibly less. Such circumferential rings are interconnected by reinforcing strands extending radially, which again can be of stainless steel cable. Lengths of such cable can be interwoven with the circumferential rings 46 in the form of a radially extending cable member, the center of which is placed at the periphery, and then the opposite ends of the cable are interwoven with the circumferential cable rings, as shown in FIGURE 10, until two adjacent radial cable members are located close together; whereupon such radial cables can be twisted together to form a junction 48 and such joined cables extend inward as a heavier radial cable member 49 until two of such members approach close together, whereupon they can be wound together at opposite sides of the disk to form a heavier cable member 50 near the central portion of the disk.

The cable reinforcement network thus formed can then be cast into the central portion of a resin sheet held in dished shape, such as shown in FIGURE 10, to form a composite disk of resin in which the reinforcing skeleton is embedded. Such a disk 1 can be secured between an inner clamping plate 51 and an outer clamping plate 52 and such clamping plates can be secured together by bolts 53. The contour of the clamping plates 51 and 52 will be complemental so as to clamp the central portion of the disk in the desired dished shape in which the disk has been formed. While a disk of cable skeleton reinforced resin will be stronger and lighter than steel it is important that such disks be made very accurately so as to be completely in balance for rotation at high speed. Also, disks of this type of construction can be fabricated readily in different desired cross-sectional shapes such, for example, as one in which the radially outer portion of the disk can be planar, while the inner portion is dished.

To process materials of different specific gravity and physical structure most effectively the disks 1 should be mounted so that the spacing between them can be adjusted. The spacing between the peripheral portions of the disks should be adjustable from a spacing of one inch to a spacing of two or three inches, depending upon the type of material being processed and the size and speed of the disks 1. Such adjustment of the disk spacing is accomplished by moving bodily the entire structure supporting the shafts 2 relative to the base 54. All of the mechanism above the base 54 is mounted on two pedestals 55. These pedestals are slidably supported on the base for shifting relatively toward and away from each other, the housing 3 includes annular rubber joints 56 connecting the side plates of the housing and its peripheral portion so that the spacing between such side plates can be altered corresponding to movement of the pedestals 55 on base 54. The shaft 14 is supported by bearings 57 which are slidable along the shaft as the pedestals 55 are separated, so that the shaft itself will not move lengthwise.

Since the bottoms of the pedestals 55 and the top of base 54 will be perfectly flat such pedestals can be moved toward or away from each other along the base without altering the alignment of shafts 2, and without disturbing the relationship between such shafts, their drive mechanism, the air supply mechanism, the material supply mechanism and its drive and the bearing lubrication system. It is only necessary that the connection 58 of the oil supply system drain and the connection 59 supplying oil to the bearings under pressure include flexible tubing long enough to enable such adjustment to be made. Also, apertures must be provided in the base 54 of a sufficient size to enable the oil supply pipes to be shifted adequately relative to the base.

The disintegrator mechanism described above can be utilized for disintegrating various types of materials which may be designated generally as cohesive materials. Such materials are of different hardness, the hardest materials being ore and Portland cement clinker. Softer materials include talc, asbestos, molding plastics and pigments. It is desirable to reduce all of these materials to a fine powder in most instances, although asbestos can simply be reduced to shreds. Softer material such as wood chips can also be reduced to fine fiber or flour character.

In general, the closer the disks 1 are placed, the larger the disks are and the faster they rotate, the more severe will be the disruptive forces created between the disks. Consequently, the harder the material to be disintegrated and the smaller the particles desired, the closer together should the disks be placed within limits. For ordinary use the rims of the disks should be spaced apart at least one inch and for processing softer material or for simply defiberizing the material, such as asbestos or wood chips, it may be desirable for the disk rims to be spaced apart three or four inches. Also, if it is desired for the pieces of material to be subdivided into coarser or more fibrous particles the quantity of air flowing through the disintegration chamber between the disks could be increased for a given quantity of solid material so that movement of the material radially of the disks would be expedited.

In order to utilize the distintegrator most effectively the feed of the cohesive material and air should be as great as possible without choking the disintegration chamber to the point where the material cannot move freely through it. If the disintegrator chamber is overloaded the particles of the cohesive material cannot whirl freely in suspension in the air so that tension disintegrating forces can be produced effectively on the pieces. The quantity of material disintegrated in a given time can be increased by increasing the rotative speed of the disks 1 within the ranges specified above for disks of representative size.

I claim:

1. A material disintegrator comprising a pair of dished disks disposed in adjacent relationship and having their hollow sides facing each other, means supplying pieces of material between said disks, driving means operatively connected to said disks and effecting rotation thereof in opposite directions at speeds such that the peripheral speed of each disk at least approaches the speed of sound, and means supporting said disks while rotating spaced apart at all locations a distance sufficiently great as to avoid grinding engagement with the pieces of material supplied between said disks.

2. The material disintegrator defined in claim 1, in which the disks are disposed in coaxial relationship and the width of the cavity between the closest approaching portions of the disks decreases progressively in width toward the peripheries of the disks over a major portion of the radius of the disks.

3. The material disintegrator defined in claim 1, in which the disks are metal.

4. The material disintegrator defined in claim 3, in which the disks are of saw steel and are curved concavely.

5. The material disintegrator defined in claim 1, in which the disks are of hard resin material having stranded reinforcing material therein.

6. The material disintegrator defined in claim 5, in which the reinforcing material includes interwoven radially extending strands and circumferentially extending strands.

7. The material disintegrator defined in claim 6, in which the reinforcing strands are stainless steel cable.

8. The material disintegrator defined in claim 1, including means supporting the rotating disks in coaxial relationship, such supporting means including shafts carrying the respective disks, bearing means mounting said shafts, and means supporting said bearing means for the respective shafts for relative movement lengthwise of the shafts to vary the spacing between the disks.

9. The material disintegrator defined in claim 1, and means supplying air between the central portions of said disks to assist in moving such material toward the peripheries of said disks.

10. The material disintegrator defined in claim 9, in which the means for supplying air to the cavity between the disks include air ducts leading to the central portions of the disks and positive displacement blower means supplying air to said ducts.

References Cited by the Examiner

UNITED STATES PATENTS

| | | | |
|---|---|---|---|
| 538,654 | 5/1895 | Burton | 241—47 X |
| 1,489,786 | 4/1924 | Povey et al. | 241—251 |
| 1,723,443 | 8/1929 | Roth | 241—247 |
| 2,164,409 | 7/1939 | Johnson | 241—5 |
| 2,386,401 | 10/1945 | Joyce | 241—1 X |
| 2,502,022 | 6/1950 | Paul | 241—5 X |
| 2,751,157 | 6/1956 | Meyer et al. | 241—38 |

ROBERT C. RIORDON, *Primary Examiner.*

J. SPENCER OVERHOLSER, LESTER M. SWINGLE, *Examiners.*

D. G. KELLY, *Assistant Examiner.*